US010581268B2

(12) United States Patent
Allgaier et al.

(10) Patent No.: US 10,581,268 B2
(45) Date of Patent: Mar. 3, 2020

(54) CONNECTING DEVICE AND METHOD FOR CONNECTING

(71) Applicant: VEGA GRIESHABER KG, Wolfach (DE)

(72) Inventors: Volker Allgaier, Haslach (DE); Holger Staiger, Hardt (DE); Tobias Mueller, Boesingen (DE)

(73) Assignee: VEGA GRIESHABER KG, Wolfach (DE)

( * ) Notice: Subject to any disclaimer, the term of this patent is extended or adjusted under 35 U.S.C. 154(b) by 455 days.

(21) Appl. No.: 15/501,353

(22) PCT Filed: Aug. 5, 2014

(86) PCT No.: PCT/EP2014/066855
§ 371 (c)(1),
(2) Date: Feb. 2, 2017

(87) PCT Pub. No.: WO2016/019982
PCT Pub. Date: Feb. 11, 2016

(65) Prior Publication Data
US 2017/0229904 A1    Aug. 10, 2017

(51) Int. Cl.
*G01F 15/00*    (2006.01)
*G06F 1/30*    (2006.01)
(Continued)

(52) U.S. Cl.
CPC ............ *H02J 9/061* (2013.01); *G01F 15/063* (2013.01); *G01F 23/00* (2013.01); *G01F 15/00* (2013.01)

(58) Field of Classification Search
USPC ........................................................ 307/66
See application file for complete search history.

(56) References Cited

U.S. PATENT DOCUMENTS 4,297,629 A    10/1981    Godard et al.
5,784,626 A    7/1998    Odaohara
(Continued)

FOREIGN PATENT DOCUMENTS

EP    0 695 017 A2    1/1996
EP    0 800 252 A2    10/1997
(Continued)

OTHER PUBLICATIONS

English translation of the International Preliminary Report of Patentability (IPRP) dated Feb. 16, 2017 in PCT/EP2014/066855 filed Aug. 5, 2014 (8 pages).
(Continued)

*Primary Examiner* — Rexford N Barnie
*Assistant Examiner* — Xuan Ly
(74) *Attorney, Agent, or Firm* — Oblon, McClelland, Maier & Neustadt, L.L.P.

(57) ABSTRACT

A connecting device is provided, including a control apparatus, an energy storage apparatus, an input connection, and an output connection, the input connection being connected to the energy storage apparatus by means of a charging apparatus, the charging apparatus being configured for controlled charging of the energy storage apparatus, the control apparatus being configured, after reaching a preset charge state of the energy storage apparatus, to connect the energy storage apparatus to the input connection; and the control apparatus also being configured, during and/or following connection of the energy storage apparatus to the input connection, to connect the input connection to the output connection.

10 Claims, 5 Drawing Sheets

(51) Int. Cl.
*H04B 5/00* (2006.01)
*H02J 9/06* (2006.01)
*G01F 23/00* (2006.01)
*G01F 15/06* (2006.01)

(56) References Cited

U.S. PATENT DOCUMENTS

| | | | | |
|---|---|---|---|---|
| 5,898,234 | A * | 4/1999 | Kitagawa | H02J 9/06 307/48 |
| 2007/0052295 | A1 | 3/2007 | Frucht | |
| 2009/0066161 | A1 | 3/2009 | Lu et al. | |
| 2010/0008012 | A1 * | 1/2010 | Ben-Yaakov | F41B 15/04 361/232 |
| 2013/0303314 | A1 * | 11/2013 | Tackett | A63B 67/06 473/571 |

FOREIGN PATENT DOCUMENTS

| | | |
|---|---|---|
| WO | 90/16105 A1 | 12/1990 |
| WO | 2005/006515 A2 | 1/2005 |

OTHER PUBLICATIONS

International Search Report dated Apr. 7, 2015 in PCT/EP2014/066855 filed Aug. 5, 2014.

\* cited by examiner

CONNECTING DEVICE AND METHOD FOR CONNECTING

FIELD OF THE INVENTION

The present invention relates to the technical field of measurement technology, in particular, fill level and limit level measurement technology and flow measurement technology. The invention relates to a connecting device, to a field device, to a method for connecting an output connection to an input connection and to a computer-readable storage medium.

TECHNICAL BACKGROUND OF THE INVENTION

The current consumption of electronic devices and apparatus in intrinsically safe current circuits is often limited by resistors in the feed line in order to prevent an ignitable spark. The prevention of ignitable sparks can help to prevent explosions.

However, a resistor in an electrical line also limits the maximum possible current consumption of connected equipment. In particular, the mean current consumption and, in particular, the peak current consumption can be limited by resistors in the supply lines. Limiting the current consumption also has the result that essentially only components whose current consumption and/or peak current consumption lies below a particular presettable maximum value can be built into a device protected with resistors. However, components which are configured for a small current consumption are complex to manufacture and are therefore associated with corresponding costs.

SUMMARY OF THE INVENTION

There may therefore be a demand to provide an efficient connection of components of a device to a current supply, voltage supply and/or power supply.

Accordingly, a connecting device, a field device, a method for connecting an output connection to an input connection and a computer-readable storage medium are described.

The subject matter of the present invention emerges from the features of the independent claims. Embodiments of the invention are contained in the subject matter of the dependent claims and the following description.

According to one aspect of the present invention, a connecting device is described which, for example, connects an input connection to an output connection. The connecting device comprises a control apparatus, an energy storage apparatus, the input connection and the output connection. The input connection is connected by means of a charging apparatus, for example a charging regulator or a current limiter, to the energy storage apparatus. The charging apparatus is configured to provide controlled charging of the energy storage apparatus, i.e. to ensure that the energy storage apparatus is charged in a controlled manner. In one example, a current which is provided by means of the input connection from a current supply, from a voltage supply and/or from a power supply may be used for charging.

The control apparatus is configured to recognise when a presettable charge state of the energy storage apparatus has been reached, and after the presettable charge state of the energy storage apparatus has been reached, for example, by measuring the charge at the energy storage apparatus, and/or following the expiry of a presettable time, to connect the energy storage apparatus to the input connection. The control apparatus is also configured to connect the input connection to the output connection during and/or following connection of the energy storage apparatus to the input connection.

In one example, connecting the energy storage apparatus to the input connection and connecting the input connection to the output connection can be carried out with different, mutually independently acting switches. In another example, switching can be carried out by one single switch and/or a combination switch, wherein the switching of the switches can take place as a function of one another. The reaching of the charge state and/or the switching of the switches can be determined by system states such as an existing charge and/or an existing voltage at a presettable site of the connecting device or can be made dependent on a particular temporal behaviour (timing).

According to a further aspect of the present invention, a field device is provided which has a power supply, a radio apparatus and a connecting device according to the invention. The power supply is connected to the input connection of the connecting device and the radio apparatus is connected to the output connection of the connecting device.

A radio apparatus can be an apparatus which is distinguished by a large current consumption. The radio apparatus can have a current consumption or a current requirement, the current peaks of which lie above the loading limit of feed resistors that are arranged between the power supply and the connecting device. An example of a radio apparatus is a Bluetooth module to which devices can be connected wirelessly. Via the radio apparatus, an operating terminal, for example a smartphone or a computer, can be connectable to a field device.

According to another aspect of the present invention, a method is described for connecting an output connection to an input connection. The method comprises the controlled charging of an energy storage apparatus via a charging apparatus, the charging apparatus being able to provide for controlled charging of the energy storage apparatus. The charging apparatus can be, for example, a current limiter or a current limiting apparatus. A current limiter can be an apparatus for limiting a current that flows through a line which is connected to the current limiter. Controlled charging of an energy storage apparatus can be understood to mean, for example, that the charging apparatus ensures that a charging current of the energy storage apparatus essentially does not rise above a presettable peak value. The charging apparatus can ensure that a current which is provided from the power supply via supply resistors to the connecting device essentially does not exceed a presettable value. The input connection is connected by means of the charging apparatus to the energy storage apparatus. The method comprises recognising a presettable charge state of the energy storage apparatus and, once the reaching of the presettable charge state is recognised, connecting the energy storage apparatus to the input connection. In order to recognise a charge state, the charge of the energy storage apparatus can be measured or a temporal behaviour monitored, for example, the expiry of a timer can be observed. The method also comprises connecting the input connection to the output connection during and/or following connection of the energy storage apparatus to the input connection. In one example, the method comprises connecting the input connection to the output connection during and/or following the reaching of the presettable charge state.

According to another embodiment of the present invention, a computer-readable storage medium is provided on which a program code is stored which, when it is executed by a processor, comprises the method for connecting an output connection to an input connection.

According to another aspect of the present invention, a program element is described which, when it is executed by a processor, comprises the method for connecting an output connection to an input connection.

A computer-readable storage medium can be a floppy disk, a DVD, a CD, a hard disk, a USB (universal serial bus) storage medium, a RAM (random-access memory), a ROM (read-only memory) or an EEPROM (electrically erasable programmable read-only memory). A communications network such as the Internet can also be regarded as a computer-readable storage medium which can enable the installation or downloading of program code.

The connecting device can be configured as an adapter or an interconnected device which can be arranged between a power supply and a field device. However, the connecting device can also be integrated into an input circuit or an input current circuit of a field device. In one example, the connecting device can be implemented as an integrated circuit and/or as discrete components. Thus, the connecting device can be provided as an input circuit in a field device. The input connection can essentially serve as a connection to a power supply. For this connection, the connecting device can have a standardised plug, to which the power supply can be connected, as the input terminal. The input connection and/or the output connection can serve as the connection to components which are to be supplied by the power supply with current, voltage and/or electrical power. The input connection can be configured to provide small currents and/or low power. For example, the input connection can have correspondingly thin lines. In order to monitor the current limiter, fuses or coils can be provided. The output connection can be configured to supply components which have a large current and/or power consumption. Accordingly, the output connection can provide thick lines.

It can be regarded as an aspect of the invention that during a switching-on process, i.e. during the change between a switched-off state in which no supply with current takes place, to a switched-on state in which a supply with current takes place, it is provided that the power supply is essentially not connected immediately after switching on to the "power hungry" components, that is to the components which have a large current consumption. In particular, the connecting device can be configured so that components can be supplied with current although feed resistors are present which provide for the intrinsic safety. This power supply to power-hungry components can be ensured in that an apparatus for intercepting transient current spikes is provided. The energy storage apparatus can serve for intercepting the transient current spikes, which storage apparatus, when a correspondingly large current is demanded, provides this current for a short time without having to demand it directly from the power supply via the resistors.

According to one aspect of the present invention, the control apparatus can be connected to the input connection.

By means of such a direct connection, for example, immediately following connection of the connecting device to a power supply, for example by means of a switch, the control apparatus can be supplied with a supply voltage and can assume its function essentially immediately following switching on or following connection. Accordingly, further components with a small current consumption can also be connected to the input connection. For example, a display and/or a keypad can have a small current consumption and can be directly connected to the input connection. Through the connection to the input connection, substantially immediately following switching on or following connection to a power supply, the display can indicate operational readiness and the keypad can provide operability.

According to another aspect of the present invention, the charging apparatus comprises a current limiting apparatus or current limiter.

The current limiting apparatus, current limiter or the charging regulator can ensure that an electric current with which the energy storage apparatus is charged does not exceed a particular limit current. For example, the current limiting apparatus can ensure that a mean current through the charging apparatus remains constant on average during the entire operation so that resistors which are present in the supply lines are substantially not loaded beyond their loading capacity limits and the restricted current consumption can be maintained with regard to the regulations and/or standards for explosion protection. The rule underlying the current limiting apparatus and according to which the current limitation is carried out is calculated, for example, for the event that a capacitor is used as an energy storage apparatus with a defined maximum input current, according to the formula $$t = C * \frac{U}{I},$$

where C is the capacitance of the capacitor installed, I is the maximum input current which is set by the current limiting apparatus and U is the supply voltage $V_{DD}$ applied. The variable t can define the time which passes until the condition for connecting the input connection and the output connection is fulfilled. Thus for a capacitor with a capacitance of, for example, 470 µF at a supply voltage of 3.0V and an input current of 700 µA, a charging time of 2.01 s results. For the determination of the size of the capacitance of the capacitor, it can be taken into account how much the supply voltage $V_{DD}$ and/or $V_{BT}$ may fall during a current pulse. The capacitor can be selected so large that given a maximum current pulse length and current pulse height, only slight variations, or no variations occur in the supply. These variations are made up from the current pulse $I_p$ occurring, the continuous current of the control apparatus $I_d$, the input resistance R, in particular $R_{in}$, in the supply line and the capacitance C of the energy storage apparatus, and the input voltage $V_{in}$ of the current supply. Therefore, $V_{DD}$ is results from the formula $V_{DD}=V_{in}-(R*(I_d+I_p))$. Here, the current pulse $I_p$ may essentially be demanded by a consumer with a large current consumption, for example a Bluetooth module. The current pulse $I_p$ can essentially arise in the output connection if the input connection and the output connection are connected. $I_d$ and $I_p$ are added on the basis of Kirchhoff's current law applied to a circuit together with $I_c$, the current which is supplied by the capacitor, and the current $I_e$. $I_e$ is the current portion that is produced by the current source. During addition, the sign which corresponds to the direction of flow of the associated current can be taken into account. It can thus be taken into account that the current which flows via the input connection and the output connection into the circuit, that is into the respectively connected modules, and which is calculated as the sum $I_d=I_p$ is equal to the sum of the current which is supplied by the source, specifically $I_e$, and the current which is supplied by the capacitor, specifically $I_e$. This results in the equation $I_d+I_p=I_e+I_c$. Using a differential equation, the formula for determining the supply voltage $V_{DD}$ then becomes $$V_{DD} = V_{in} - R*(I_d + I_p) + V_{in}*e^{-\frac{t}{R*C}}.$$

In this formula, an internal resistance of the capacitor that is possibly present may be negligible and may therefore not have to be taken into account, since this internal resistance is chosen to be very small in comparison with the input resistor R.

The maximum input current $I_e$ may either be predetermined by the wiring, which is selected so that the requirements of explosion-proofing are fulfilled, or it may be defined due to other internal wiring arrangements of the source. For example, the source may supply a maximum input current $I_e$ of 2 mA. The control apparatus and other components with small current consumption, for example a display, a keypad or a data store, may each require a current of 1.3 mA. Thus the current $I_C$ for the charging of an energy store can be rated at 700 μA.

According to another aspect of the present invention, the control apparatus is equipped for determining the charge state of the energy storage apparatus with a charge state determining apparatus, for example a timer, a voltage meter and/or a charge meter.

A timer can ensure, for example, that a switching signal which provides for the connection of the energy storage apparatus to the input connection is not generated before a definable time point which is defined so that the charge state of the energy storage apparatus is sufficient to prevent possible current spikes on the supply lines to be protected with the resistors. In one example, a timer is configured so that the installed capacity C of the energy storage apparatus requires, with the current as set, a charging time of t=2 s. For this purpose, the formula $$t = C*\frac{U}{I}$$

is used for calculating the charging time and is thus used for dimensioning the timer.

If the control apparatus, for example a microcontroller, has a voltage measuring apparatus or a voltage meter, for example an A/D (analogue to digital) converter, then it is possible by means of the voltage applied to the energy storage apparatus or to the capacitor, to determine the charge state if the capacitance of the capacitor is known. If the charge state is sufficient, the control apparatus can provide that the energy storage apparatus is connected to the input connection and/or that the input connection is connected to the output connection in order to activate consumers that need a large current.

According to a further aspect of the present invention, the energy storage apparatus or the energy store is configured as a capacitor or a capacitance.

Since the capacitor intercepts current spikes, the capacitor can also be designated a buffer capacitor. In this case, the capacitor is configured to be able to deliver a large current in a short time and to satisfy a demand for current in the output connection for a presettable time without the current having to be provided from an external current source, voltage source and/or power source. Thus, a temporarily required current spike can be provided by the connecting device itself. For the transient current supply, the power supply lies on the other side from the current source, in relation to a resistance in the supply line. The energy storage apparatus assumes the role of the current supply for a short time.

According to yet another aspect of the present invention, the input connection has a resistor for intrinsic safety.

Intrinsic safety can be designated as the property of a circuit of being configured or dimensioned such that, in all states assumed by the circuit, a voltage drop caused by a current flow does not exceed a presettable limit value. An intrinsically safe circuit can prevent sparks arising at any site on the circuit which could lead to explosions in environments laden with gases. Additionally, such a circuit can prevent inadmissible heating which can also lead to an ignition, for example, the igniting of a gas mixture.

According to another aspect of the present invention, the input connection is configured as a busbar in order to connect an apparatus with a small current requirement and/or the output connection is configured as a busbar in order to connect an apparatus with a large current consumption.

In order to ensure a transmission of a large current via the busbar, cable cross sections or line cross sections are used, for example, which are thicker at the output connection than at the input connection. A consumer or a multiplicity of consumers can be connected to a busbar. In the case of the busbar for apparatus with a large current consumption, it should be noted that the current consumption of the individual consumers can add up to a large current consumption. A larger current can occur essentially transiently in the busbar associated with the output connection than in the busbar associated with the input connection.

According to another aspect of the present invention, the energy storage apparatus is dimensioned so that a presettable current can be provided for a presettable time.

The dimensioning of the energy storage apparatus can be oriented to the current consumption and/or the temporal behaviour of one or a multiplicity of connected consumers. For example, a radio module can switch on in each case for only a short time and within this short time may lead to a current consumption which can manifest itself as a current spike in the output connection.

According to another aspect of the present invention, a field device, measuring device or evaluation device may be a fill level measuring device, a flow measuring device, a limit level measuring device, a temperature measuring device, a fill level measuring device based on the emission of radar beams, or a field device based on the principle of guided microwaves.

It should be noted that different aspects of the invention have been described with respect to different subjects. In particular, some aspects have been described with respect to device claims, whereas other aspects have been described with respect to method claims. However, a person skilled in the art will be able to discern from the description provided above and from the following description that, apart from when indicated otherwise, in addition to any combination of features which belongs to one category of subjects, any combination of features which relates to different categories of subjects is also considered as being disclosed by this text. In particular, combinations of features of device claims and features of method claims are also disclosed.

BRIEF DESCRIPTION OF THE DRAWINGS

Further exemplary embodiments of the present invention will now be described with reference to the drawings.

DETAILED DESCRIPTION OF EMBODIMENTS

The illustrations in the figures are schematic and not to scale. In the following description of FIGS. 1 to 8, the same reference numbers are used for the same or corresponding elements.

Figure 1:
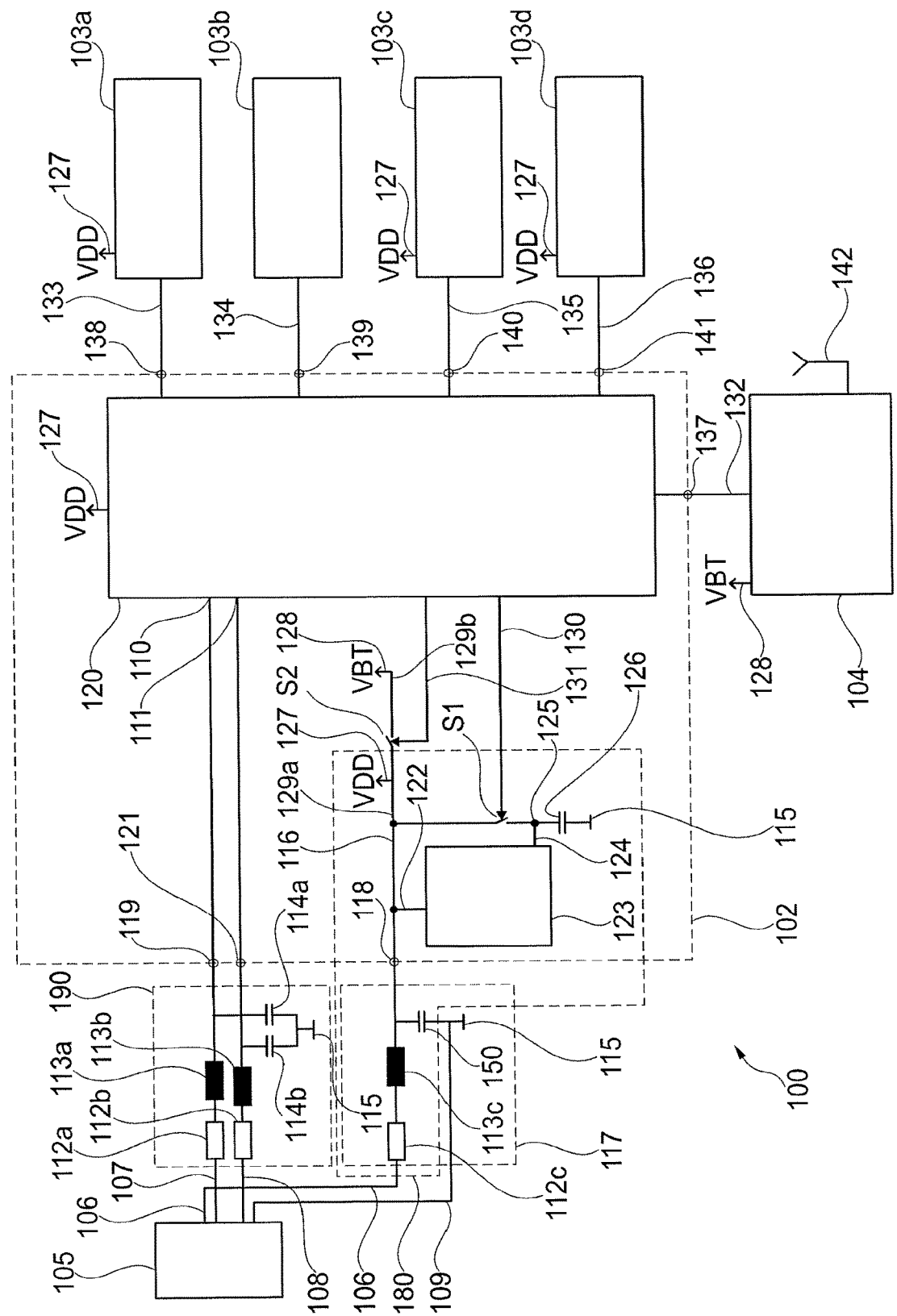
FIG. 1 is a block circuit diagram of a connecting device according to an exemplary embodiment of the present invention.

FIG. 1 is a circuit arrangement 100 comprising an input current circuit 117, the connecting device 102 and a multiplicity of consumers with a small current requirement 103a, 103b, 103c, 103d as well as a consumer with a large current requirement 104.

No current supply is shown in FIG. 1. A current supply can be associated with the input current circuit 117. However, FIG. 1 shows the contact surface 105 with four current connections 106, 107, 108, 109. A current supply can be connected to the contact surface 105 which can form an external connection, for example, by means of sliding contacts. The contact surface can be configured as a physical I²C bus or I2C bus (inter-integrated circuit) and connected via sliding contacts to the current supply and/or further data lines which can be accommodated, for example, in a cover of a field device. Accordingly, the two data lines 107, 108 are shown in FIG. 1. The data lines 107 and 108 differ in that one line 107, 108 is designed as a clock line and the other line 107, 108 is designed as a data line, as provided, for example, by the physical implementation of the I2C bus. In another example, if the data lines 107, 108 are implemented as part of the UART specification, one line 107, 108 can be designed as a transmission line and the other line 107, 108 as a receiving line. In a further example, the lines 107, 108 can also be designed for transmitting or receiving differential signals, as is the case in an RS-485 interface.

The data lines 107, 108 are connected via an explosion protection and electromagnetic compatibility (EMC) protection 190 to the data input 110 of the control apparatus 120, the microcontroller 120 or the CPU (central processing unit) 120. Similarly, a connection of the contact surface 105 via the data line 108 and the explosion and EMC protection 190 of the data line is connected to the data output 111 of the control apparatus. The explosion and EMC protection 190 for the data lines 107, 108 has in each case a coil 112a, 112b for the connections connected to the data input 110 and the data output 111, and an input resistor 113a, 113b and capacitors 114a, 114b which are connected to the chassis potential 115 and the data input line 107 or the data output line 108.

Similarly, the current supply lines 106, 109 are connected via an explosion and EMC protection 117 of the supply lines or of the input connection to the input connection 116, 118. In a state connected to a current supply, the supply lines 106, 109 conduct a DC current. The chassis grounding line 109 for the current supply is connected to the chassis connection 115. Furthermore, the supply line 106 or phase 106 is connected via a coil 112c and via an input resistor 113c to the input connection 116, 118. The output of the resistor 113c is separated by means of a capacitor 150 from the chassis potential 115. It can be seen from FIG. 1 that the input connection 116 can be configured as an input line. For coupling to the explosion and EMC protection 190 for the data lines 107, 108 and the explosion and EMC protection 117 for the current supply lines 106, 109, the input connection 116 can comprise a plug-in contact 118. Similarly, the data input 110 or the data output 111 can be configured via plug-in contacts 119 and 121 and associated data lines in order to provide a releasable connection to the explosion and EMC protection 190.

The input connection 116 is connected by means of the spur line 122 to the charging apparatus 123 which in turn is connected by means of a line 124 at the node point 125 to the energy storage apparatus 126. Another connection of the energy storage apparatus 126 is connected to the chassis grounding line 115. The energy storage apparatus 126 can be a capacitance 126 or a capacitor 126. The capacitance C of the capacitor 126 can have a value of between 400 µF and 1000 µF. The energy storage apparatus 126 separates the nodal point 125 from the chassis potential 115. The nodal point 125 represents the site in the system which, on application of a supply voltage $V_{in}$, shows a linear rise in the capacitor voltage and, following the charging process, is switched by means of S1 to the voltage $V_{DD}$ which exists at the line 129a. The current $I_C$ for charging the capacitor is supplied by the line 124 from the charging apparatus 123.

Also arranged at the nodal point 125 is the switch S1, by means of which the node 125, in particular the capacitor 126 and/or the current limiter 123, is connected to the input connection 116. The input connection 116 has the busbar 127 which, in a switched-on state, carries a supply voltage $V_{DD}$. This supply voltage $V_{DD}$ is a signal which can only be lightly loaded and is provided by a current supply. The supply voltage $V_{DD}$ is, in particular, a supply signal for consumers with a small current requirement. Current consumption values of typical components for a field device such as a microcontroller or a display are in the range from 0.1 mA to 1.5 mA. The resultant current consumption values are dependent on various factors, such as the different standby modes in which the components are operated. It is not exactly predictable at which time points which component is active. Thus, during a dimensioning of the energy storage apparatus 126, only estimated values can be used, for example mean values for on/off behaviour. The supply connection 116 and/or the busbar 127 is connected to a corresponding supply connection 127 of the control apparatus 120, the CPU 120 or the microprocessor 120. By means of this supply connection 127, a supply voltage $V_{DD}$ can be provided to the microprocessor 120 with a corresponding supply current in order to ensure the operation of the CPU 120. The low-voltage busbar 127 can also be connected to a display apparatus 103a or a display 103a, to a storage apparatus 103c or an EEPROM or a flash memory 103c and/or to a current limiter 103d having an LED for backlighting a display. Keypads 103b do not necessarily have to be connected to $V_{DD}$ if the keys are connected to pull-up resistors integrated in the microcontroller 120 and provide a "LOW" signal at the microcontroller 120 on a key press. In another example, the keypad could be configured, for example, with capacitive sensors in order to enable a touch operation, which could make necessary a connection to $V_{DD}$ for supply.

The connecting device 102 has a second switch S2. This second switch S2 is arranged between the busbar 127 for consumers with a small current requirement and the busbar 128 for consumers with a large current requirement. The switch S2 therefore separates the two busbars 127 and 128. In particular, the switch S2 separates the input connection 116 and the output connection 129b, the output connection 129b being able to comprise the busbar 128 for devices with a large current requirement. In the event that S2 is open, the part 129a of the input connection 116 facing the busbar 127 represents an output connection.

The switch S1 is controlled by means of a first control signal which can be provided via the control line 130 by the control apparatus 120. The switch S2 is controlled by means of a second control signal which can be provided via the second control line 131 by the control apparatus 120. On actuation, i.e. in the case shown in FIG. 1, on closing, the switch S1 can connect the energy storage apparatus 126 to the input connection 116.

The switch S2 can connect the input connection 116 to the output connection 129b, by which means the busbars 127 and 128 are connected to a common busbar, in particular to a common output connection 129a, 129b. This means that if the switch S2 is actuated and if the input connection 116 and the output connection 129b are connected, the busbar 127 and the busbar 128 are at the same potential. In this case, the voltage $V_{DD}$ on the busbar 127 corresponds to the voltage $V_{BT}$ on the busbar 128. In the case of an open switch S2, a potential $V_{DD}$ exists only on the busbar 127 and at the output connection 129a, in order to supply the devices or modules that have a small current requirement. The potential on the second busbar 128, in particular at the output connection 129b, in this case is 0V.

The radio module 104, in particular the Bluetooth module 104, is connected via the busbar 128 for devices with a large current requirement. The radio module 104 is connected via the data and control line 132 to the control apparatus 120. By means of the control line 132, the control apparatus 120 can provide a UART (universal asynchronous receiver/transmitter) modem functionality for data exchange and a functionality for flow control. In addition, further signal lines can be present in the line 132 since it may be necessary, for example, for information to be transmitted to the microcontroller 120 concerning a connection status or a received field strength (received signal strength identification, RSSI) of the radio module 104. The control line 132 can be configured as a parallel bus via which data are exchanged from and to, that is bidirectionally, between the radio module 104 and the control apparatus 120. Alternatively, the line 132 can be configured as a UART.

The display apparatus 103a is connected via the connecting line 133 to the control apparatus 120 and can exchange data and control signals via the line 133. The keypad 103b is connected via the connecting line 134 to the control apparatus 120. Quadruple GPIO (general purpose input/output) is offered via the connecting line 134. In microcontrollers, a pin is denoted GPIO if it can be switched over functionally between a digital input, a digital output or other functions, for example an analogue input. Each key of a keypad 103b is connected to a digital input of the microcontroller 120. On actuation of the keys, the respectively associated line is switched to "LOW", i.e. the digital input is switched to the potential GND in that it is connected to the connection 115. In the resting state, the line is held, by means of pull-up resistors at "HIGH". These pull-up resistors can also be arranged at 103b and provide a chassis grounding line GND 115.

The storage apparatus 103c, for example a data store, is connected via the storage connecting line 135 to the control apparatus 120. The storage connecting line can be configured as an I²C line or an SPI (serial peripheral interface) line. The current limiter 103d with an LED for the display illumination is connected via the current limiter line 136 to the control apparatus 120. The current limiter 103d serves to make available only a particular quantity of current for the LED. If this current limiter were not used, during operation of the LED too much current would possibly be driven into the LED and it could be destroyed or the supply voltage $V_{DD}$ could be too severely loaded. In addition, in norms regarding intrinsic safety, a maximum quantity of electrical energy is prescribed for optical radiators. This maximum value lies in the region of 15 mW. The current limiter 103d could also be configured as an intelligent current driver which could also be settable in order to control the brightness.

The control lines 132, 133, 134, 135, 136 are connected by means of corresponding connections to the connecting device 102. The connections have the reference signs 137, 138, 139, 140. The provision of the connecting device 102 between the explosion and EMC protection apparatuses 190, 117 and the consumers 103a, 103b, 103c, 103d, 104 can be used for a separation of the consumers into consumers with a small current requirement 103a, 103b, 103c, 103d and consumers with a large current requirement 104. The separation in this case takes place by means of the connection to the respective busbar 127, 128. The separation can thus be spatial. For fault-free operation, the radio module 104 having the antenna 142 requires a large current, in particular a high power. The current or the power may be provided for a short period, by which means a large current pulse may result. Values for displays 103a can lie in the range of 100 μA to 500 μA where graphical displays are concerned, in particular two-colour or black and white displays. A typical consumption value for a microcontroller is, for example, in the power class Cortex M0+ core with 196 kB flash memory and in the active mode at approximately 0.5 mA to 1.5 mA, and in standby at less than 100 μA. A data store EEPROM 103c in standby, i.e. without read and write access, can lie in the range of 1 μA to 1.5 μA and during read or write access in the range from 2 mA to 5 mA.

A Bluetooth module 104 can have significantly larger current consumption values. Thus, during radio activity, it can generate spikes of approximately 15 mA for 1 to 3 ms. Thereafter, it enters standby mode wherein the standby current is at approximately 1 μA to 40 μA. A design rule can provide, for example, that only a single module of each type 103a, 103b, 103c, 103d is provided and that only one instance is used in each case by the radio module 104. In one example, the voltage $V_{DD}$ is monitored, for example, by means of analogue to digital conversion or by means of a comparator which monitors an analogue threshold and, given a corresponding recognition of an excessively small supply voltage, switches off some components 103a, 103b, 103c, 103d. Recognition and switching off can be carried out by the control apparatus 120.

Consequently, by means of the connecting device 102, an energy distribution can be controlled and an energy supply concept for a circuit 100, for example a current supply circuit for a field device, can be constructed. The connecting device 102 has a low component requirement and has substantially no switching element, which can result in a high level of EMC security. DC/DC (direct current to direct current) converters are designated switching components which carry out a voltage conversion in that they are operated in a clocked manner. The connecting device 102 has very high efficiency. The efficiency of the circuit is given by the ratio of the output power to the input power. Since DC/DC converters have an efficiency level of less than 100%, energy is always wasted in such a circuit. With the uniquely controlled charging of the capacitor and the subsequent easy switching to the line 127, following charging, substantially no further energy loss arises due to switching components. The current limiter 123 can also be switched off, so that no leakage current or other currents result in consumption. Thus the only energy loss is still in the resistors 113a, 113b, 113c which are responsible for the intrinsic safety.

Since the connecting device uses no clocked switching controller, the losses can be prevented. The connecting device 102 can, however, take account of the starting behaviour of a device, in particular a field device or evaluating device without leading to a starting behaviour that is unusual for a user. In other words, with the aid of the connecting device 102, the switching-on behaviour may be controllable by means of resistors 113a, 113b, 113c, despite explosion and EMC protective measures used, so that the consumers needed at the start time point are usable. Only consumers with a large current requirement still remain switched off during the starting procedure. By means of these measures, an intrinsically safe supply can be used in order to supply electronic components 104 with a high power demand although the current supply can only make a low power level available to ensure the intrinsic safety. By means of the connecting device 102, the current consumption in the start phase can be efficiently distributed and an efficient operation of intrinsically safely supplied devices can also be ensured in that the charging of the energy storage apparatus 126 is controlled and/or regulated and consumers are switched on and off accordingly. The switching off of different consumers can be used in order, if relevant, to prevent the drawing of too large a current. Detection of such a situation can take place as described above.

In order to monitor a charge state of the energy storage apparatus 126, the control apparatus 120 has, for example, a timer. Alternatively or in addition to a timer, the control apparatus 120 can have a voltage or charge meter which connects the energy storage apparatus 126 to a measuring input of the control apparatus 120 (a timer and/or a voltage meter are not shown in FIG. 1 since it/they is/are integrated in the control apparatus 120). By means of such a monitoring apparatus, for example, by means of the timer or a voltage measuring apparatus, the switching of the switches S1 and/or S2 can be controlled so that the switches S1, S2 are actuated, i.e. closed, at suitable moments.

The contact surface 105 and the input resistors 113a, 113b, 113c can be allocated to a current supply and/or voltage supply (which are not shown in FIG. 1). The resistors 113a, 113b, 113c essentially ensure the intrinsic safety, i.e. the explosion and EMC protection. In particular, the resistors 113a, 113b, 113c essentially provide the explosion protection, whilst the inductors 112a, 112b, 112c and the capacitors 114a, 114b, 150 essentially provide the EMC protection. Starting from the contact surface 105 downstream of the resistors 113a, 113b, 113c, the connecting device 102 is arranged between the protection apparatus 190, 117 and the consumers 103a, 103b, 103c, 103d, 104. Thus the energy store 126 is connected downstream of the resistors 113a, 113b, 113c. However, this energy storage apparatus 126 is not charged directly via the resistor 113c of the current supply protection apparatus 117, but by means of the charging apparatus 123 or current limiter 123. The supply line 116, 129b which comprises the two busbars 127, 128 is arranged in parallel with the current limiter 123. The busbars 127, 128 lead to the individual modules of the electronics 100 of the respectively considered device.

Through the arrangement of the switch S2, it is ensured that on application of a voltage supply, a current supply and/or a power supply to the input connection 116, at least the control apparatus 120 is connected to the supply voltage which is provided by the power supply. This may mean that the supply connection 127 and the output connection 129a of the control apparatus 120 are firmly connected to the busbar 127 of the input connection 116. If a supply voltage is applied to the contact surface 105 and thus also at least to the input connection 116, the busbar 127 rapidly reaches the desired target value for the voltage at the level of the supply voltage $V_{DD}$. By means of the rapid application of the supply voltage $V_{DD}$ to at least the control apparatus 120, the control apparatus 120 can begin its work before other modules are supplied.

In parallel with supplying the control apparatus 120, the energy storage apparatus 126 can be charged over a relatively long period. For this charging also, the voltage at the level $V_{DD}$ is used. Since no voltage increasing components are present, $V_{DD}$ is the only available voltage which can be used for the charging. For example, the storage apparatus 126 can be dimensioned so that the presettable charging is achieved in a period of five seconds (5 s). The reaching of the desired charge can be monitored, for example, using a timer which is set to five seconds, or by monitoring a voltage applied at the energy storage apparatus 126.

Once the energy storage apparatus 126 has reached the desired charge value and is charged up, the energy store 126 is connected to the supply line 116, 127, 129a via the first switch S1 which is controlled by the control apparatus 120. In other words, the energy storage apparatus 126 is connected by means of the switch S1 to the input connection 116, in particular to the busbar 127 for consumers with a small current requirement. By means of this connection, the supply line, the input connection 116 and, in particular, the busbar 127 are buffered with a high capacitance 126. This means that current variations can be balanced out by means of the high charge stored in the storage apparatus 126.

By means of the energy storage apparatus 126 connected in, collapses in the supply voltage $V_{DD}$ can be balanced out effectively. Collapses in the supply voltage can be caused, for example, by current pulses which occur during operation, for example because a supplied device has a momentarily large current requirement. By balancing out the collapses in the supply voltage, collapses in the supply have little effect over the operating period. Thus a substantially constant current supply and/or voltage supply to the modules can be ensured.

Since the energy storage apparatus 126 lies downstream of the line resistors 113c seen from a current supply, due to the balancing out of a collapse in the supply voltage by means of the energy storage apparatus 126, the line resistors 113c are hardly affected. Thus, the overall energy loss in the circuit is low since no energy is lost by too large a current in the input resistor 113c.

By means of the size of the capacitance of the energy storage apparatus 126, the buffer power can be adapted to the respective use, i.e. to the respective modules to be supplied that are present. The provision of the connecting device 120 can also result in the start time and thus the time until full operational readiness of the overall device 100 being increased. In other words, the basic functionality such as a display or a keyboard can be provided rapidly. However, a longer period may elapse until full operational readiness, e.g. with a radio apparatus 104, depending on how large the energy storage apparatus must be. By means of the direct supply of the control apparatus 120 via the input connection 116 and the busbar 127, the control apparatus 120 can be supplied directly from the supply branch for consumers with a small current requirement 127. If the output connection 129b is not switched in, the busbar 127, in particular a part 129a of the input connection, forms the output connection. There is therefore no need to wait until the buffer effect of the energy storage apparatus 126 is achieved if the control apparatus takes up its operation and only low power basic functions are provided. Only the output connection 129b for devices with a larger power requirement is switched in later, so that the output connection 129a, 129b is extended. Thus an immediate supply of the basic functionality of the circuit, i.e. at least the operation of the control apparatus 120, can be assured.

If display apparatuses 103a or input apparatuses 103b are also directly connected to the input connection 116 and in particular to the busbar 127, then at switch-on, they are also immediately supplied with the unbuffered supply voltage $V_{DD}$. Thus, an immediate signalling to a user of the switched-on state can be enabled. For a user, the device 100 therefore appears superficially to be immediately ready for operation, even if modules with a large current requirement, such as the radio module 104, are not yet switched on but are waiting until a sufficient buffer effect of the energy storage apparatus 126 is available. Through the immediate provision of the supply voltage by means of the busbar 127, however, a display apparatus 103a or a display 103a can be immediately switched on and the device 100 operated by means of keys. The keys 103b shown in FIG. 1 require no dedicated current supply. Only pull-up resistors are possibly required. Alternatively, a capacitive method can also be used here in order to enable a touch operation.

The integrated radio unit 104 or radio apparatus 104, however, remains switched off until the energy storage apparatus 126 has built up the required buffer effect. The radio apparatus 104 can be an electronic module with a large peak current consumption.

The control apparatus 120 is configured such that it has a small current consumption and in the unbuffered state does not draw upon the supply voltage $V_{DD}$, or only slightly. The current consumption of a microcontroller 120 can be influenced by a plurality of measures. For example, the CPU 120 can be placed in the standby state or the clock frequency can be adjusted, wherein a high clock rate corresponds to a large current. A smaller current consumption can be achieved at the cost of slower processing. Individual hardware components can also be activated or deactivated, for example via the UART interface, the SPI or I2C interface or by means of comparators. As a further measure for influencing the current consumption, the integrated interfaces of the microcontroller can be switched off. Switching off may be necessary since these interfaces are operated with a clock signal and therefore also need a current, even if no data communication is currently taking place.

Due to the small current consumption of the control apparatus 120, the overall current requirement for the device 100 in the start phase, i.e. at the time at which the energy storage apparatus 126 is not yet operationally ready, can be kept below a particular limit value. Even on loading of the current supply simultaneously by the control apparatus 120 and the charging current of the energy storage apparatus 126, the resulting current can be kept via the resistor 113c below a limit value although the large energy store is already charged. The control apparatus 120 is configured so that it switches on current consumers with a large current consumption, for example the radio module 104, only following the charging of the energy storage apparatus 126. The switching on of the consumers may take place through the application of a suitable voltage.

By means of the connecting device 102, a current limiting apparatus which remains long-term in a supply branch can be replaced, for example, in the input connection 116 or in the busbars 127, 128. It can thus be avoided that a current limiting apparatus must be used which, given very rapid rise times of current spikes, must react very rapidly by means of a regulation corresponding to the rise time. Components having a correspondingly rapid regulation in order to react to the rapid rise times of current spikes would themselves have a large current consumption and on sustained retention in the input connection 116 or output connection 126 would lead during operation to large losses. By means of the connecting device 102, the current limiting apparatus 123 can be utilised purely temporarily, so that a good efficiency level of a circuit 100 can be achieved.

Figure 2:
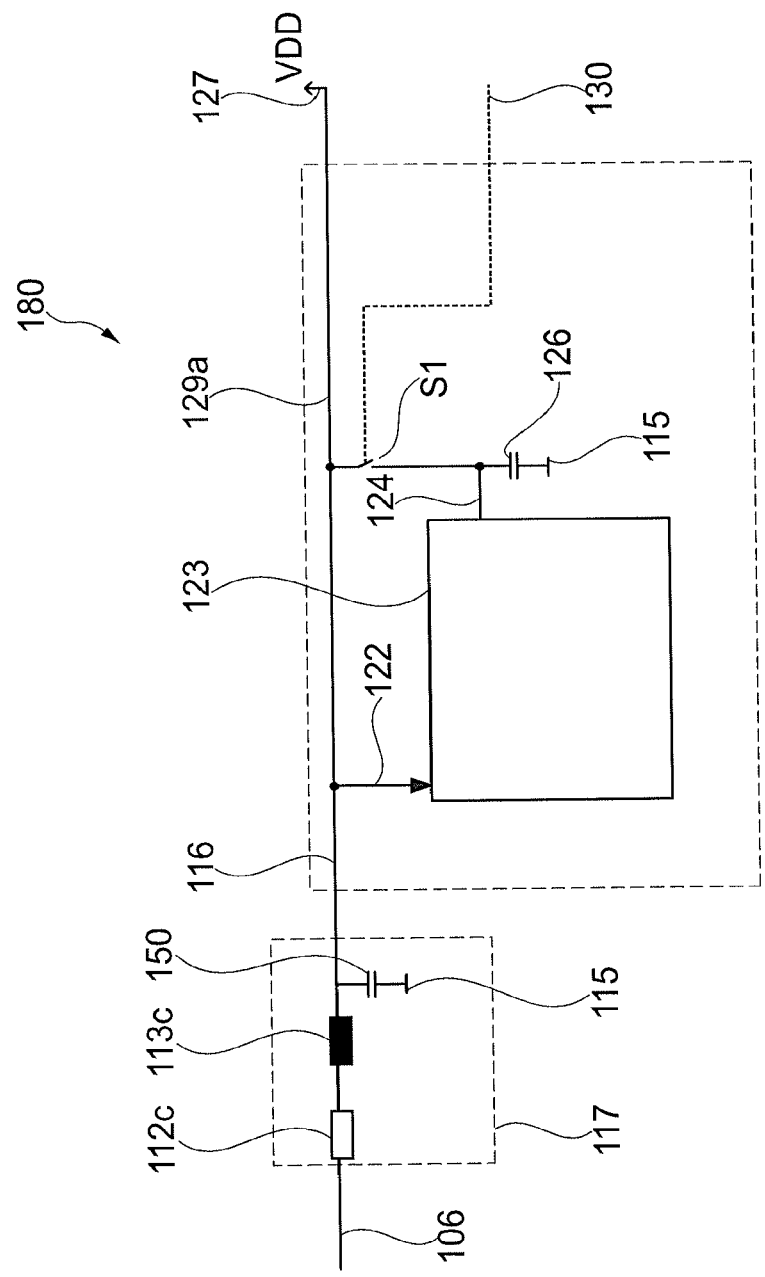
FIG. 2 is a block circuit diagram of a portion of the part of FIG. 1 responsible for the current supply in accordance with an exemplary embodiment of the present invention.

FIG. 2 shows a portion 180 of the part of the circuit 100, in particular of the device 100 of FIG. 1, responsible for the current supply. This circuit portion comprises the supply line 106 and the explosion and EMC protection apparatus 117 having the coil 112c and the resistor 113c. FIG. 2 shows the state in which the energy storage apparatus 126 is not yet connected to the input connection 116, so that the input connection 116 is connected only to the busbar 127, in particular to the output connection 129a, and consequently the busbar 127 carries the supply voltage $V_{DD}$ of a power supply (not shown). Since the input connection 116 and the busbar 127 are connected, both can be configured as a supply branch or a supply line. By means of the control line 130, the switch S1 is controlled by the control signal of the control apparatus (not shown in FIG. 2).

Figure 3:
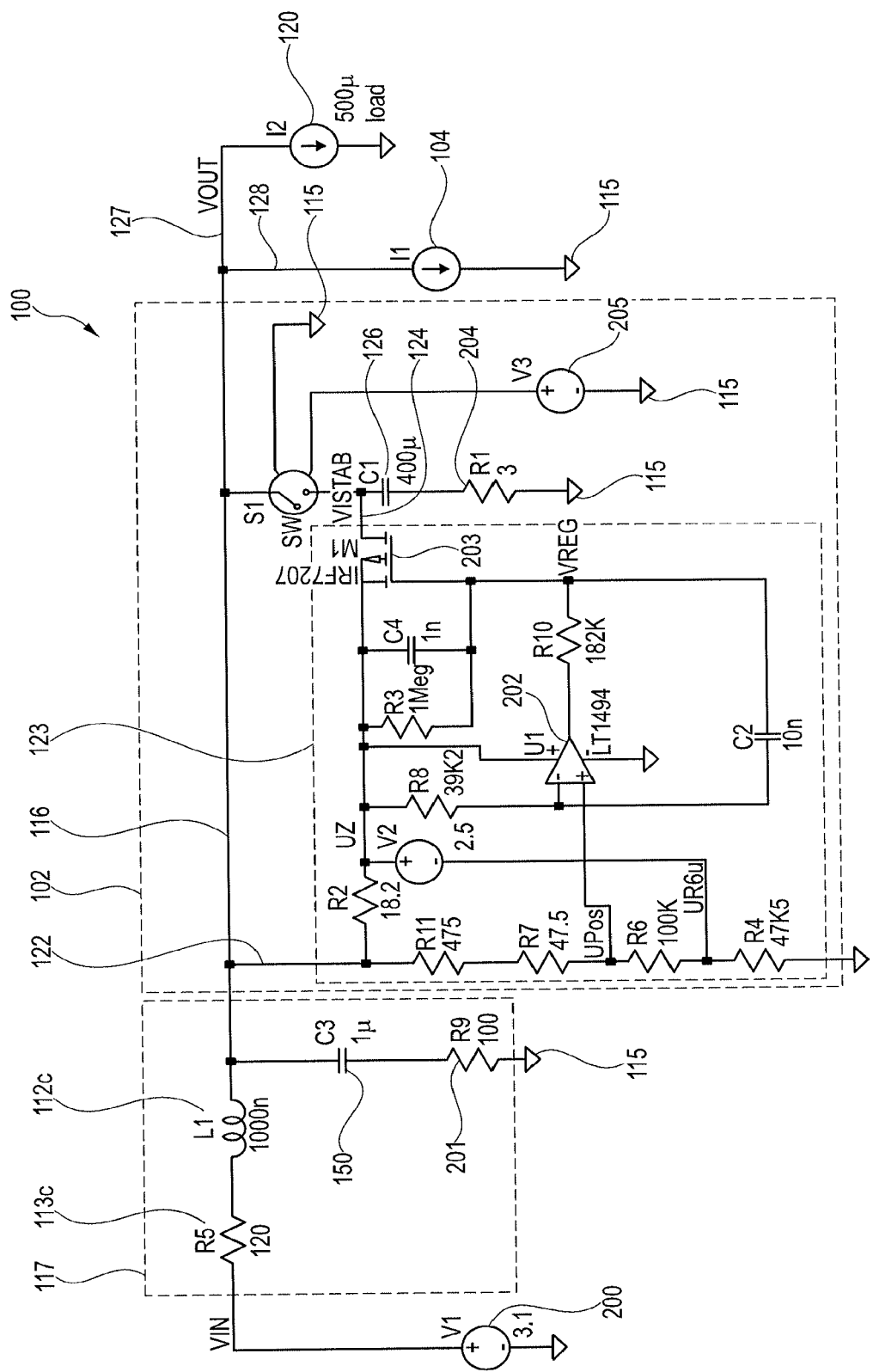
FIG. 3 is a circuit diagram of a simulation model for a device according to an arrangement of FIG. 1 in accordance with an exemplary embodiment of the present invention.

FIG. 3 is a circuit diagram of a simulation model for a device 100 according to an arrangement of FIG. 1 in accordance with an exemplary embodiment of the present invention. In this circuit diagram, the power supply 200, the current supply 200 or the voltage supply 200, V1 is configured as a voltage supply where V1=3.1 V. This voltage V1 is passed on as $V_{IN}$ to the series resistor 113c. The series resistor 113c, R5 is provided for the intrinsic safety of the circuit, for example, for the circuit 100 of a field device. The voltage $V_{IN}$ is applied to the series resistor 113c. A coil 112c, L1 is connected downstream of the series resistor 113c, R5. The resistor R5 is configured to be 120 Ohm and the coil L1 to be 1000 nH. The coil is an EMC filter inductor 112 and is connected to the EMC filter capacitor 150, C3 with a value of 1 µF and a resistor 201, R9 to the chassis connection 115. The input connection 116 of the connecting device 102 is connected to the EMC filter inductor 112c and the EMC filter capacitor 150. Also connected to the input connection 116 is the charging apparatus 123 or the current limiter 123 which essentially comprises an operational amplifier 202, U1 and, controlled by this operational amplifier, a transistor 203, M1 which is configured as an actuator for the current limiter.

Connected at the output 124 of the current limiting apparatus 123 via the output line 124 is the energy storage apparatus 126, which is charged by means of the regulated current which is made available by the output line 124. The energy storage apparatus 126, C1 is configured as a capacitor with the capacitance 400 µF. Present at the energy storage apparatus is the voltage $V_{ISTAB}$, by means of which the control apparatus 120 can determine the charge state of the storage apparatus 126. The energy storage apparatus 126 is connected via the resistor 204, R1, which has a value of 3 Ohm, to the chassis connection 115.

The switch S1 is arranged between the input connection 116 and the energy storage apparatus 126 and is controlled temporally in the simulation circuit by means of the voltage source 205, V3. The voltage source V3, 205 is connected at 115 to the chassis connection GND. The switching signal to S1 emitted from the voltage source V3, 205 corresponds to the control signal 130 which comes from the control unit 120. Consequently, V3 simulates the switching signal for the switch S1. The connection 115 serves for the correct connection of the switch S1. The switch S1 is used for switching on the energy store 126 on the supply branch 116 or input connection 116. The control apparatus 120 and all the consumers with a small current requirement are represented as a current sink I2 which is arranged on the busbar 127. In FIG. 3, the supply voltage for the circuit $V_{OUT}$ corresponds to the supply voltage $V_{DD}$. $V_{BT}$ is not provided separately in the simulation and thus coincides with $V_{OUT}$. Also, no switch S2 is provided in the simulation. The function of switching the switch S2 is achieved and simulated in the simulation by the controlled current sink I1 which corresponds to the switching of the switch S2. This current sink I1 begins following the set start time to emulate the current pulses of the large current consumer. This means that the switch S2 can be dispensed with in the simulation.

By way of example, a consumer with a large current requirement, such as the radio module 104, is represented by the current sink for the current I1 in the simulation, which is switched on and off in a pulsed operation, the first pulse occurring 1.76 s after the start of the simulation. The current sink I1 simulates the two currents 10 µA as the base load and/or the standby current for the Bluetooth module and 15 mA according to the current occurring in practice with the Bluetooth module 104 switched on. The rise time for the current sink I1 is defined as being 0.01 ms and the fall time for the current sink I1 also as 0.01 ms. The switch-on duration of the current pulse is defined as 1 ms and the period duration is 100 ms. One hundred cycles are performed, the number of cycles not being restricted. Thus, the current sink I1 simulates the current requirement of a pulsed consumer 104 or a group of consumers, for example, a radio module 104 or a flash storage medium, in particular a device with a temporarily large current requirement.

The current sink I2, 120 simulates a substantially constant load with a current consumption of 500 µA and serves essentially to simulate the current requirement of the control apparatus 120. Once the current requirement of the pulsed consumer is represented by the current sink I1, 104, the switch S2 can be dispensed with in the simulation circuit of FIG. 3. The pulsed operation simulates the temporary switching-on and the large current requirement associated therewith of the radio module at a time when the capacitor 126 is switched in. The busbar 128 connects the current sink 104 to the input connection 116. The temporal sequence of the switching of S1 and the start of the pulsed operation of I1 is firmly set in the simulation. No separate timer control or voltage measurement is provided for the operation of S1. The timer control of the switching-off of the capacitor 126 is determined by the temporal behaviour of the voltage source V3. The voltage source V3 switches S1 after 1.7 s and the current sink I1 begins pulsed operation after 1.75 s.

Figure 4:
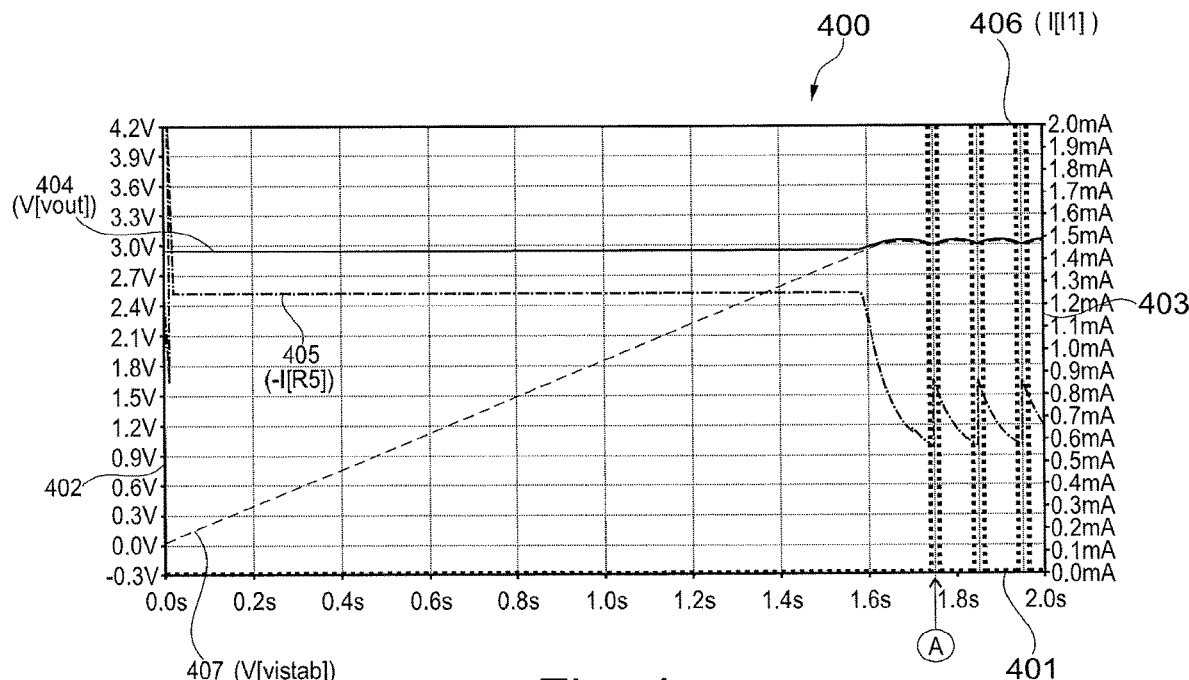
FIG. 4 is a graphical representation of a simulation result of a simulation carried out with the circuit arrangement according to FIG. 3 in accordance with an exemplary embodiment of the present invention.

FIG. 4 shows an evaluation result of a simulation carried out in accordance with FIG. 3 which simulates the real and physical properties of S1. The results are shown in a graph 400 which forms a coordinate system with an abscissa 401 and with a first ordinate 402 scaled in voltage values from −0.3 V to +4.2 V in 0.3 volt increments and with a second ordinate 403 which is scaled in current values from 0.0 mA to 2.0 mA in 0.1 mA increments. The abscissa 401 itself indicates a time sequence in the range from 0 seconds to 2 seconds which encompasses a switching-on process. Here the time point 0.0 s represents the time point of the start of the simulation and at 1.7 s, i.e. following the complete charging of the energy storage apparatus 126, is activated by the voltage source V3 of the switch S1. The temporal sequence of V3, that is the sequence of the temporal behaviour of S1, is not shown in FIG. 4 as a curve.

FIG. 4 shows the variation of the voltage $V_{OUT}$ 404 which is applied to the busbar 127. In addition, the current behaviour 405, $-I_{R5}$ through the resistor R5 113, the series resistor for intrinsic safety is shown. Furthermore, the current variation of the pulsed current sink I1, 406 is shown, i.e. that of the device with a large current requirement 104. The voltage change VISTAB, 407 across the energy storage apparatus 126 which represents the voltage behaviour with stabilised current is also shown. The voltage VISTAB 407 across the energy storage apparatus 126 rises linearly due to the constant charging current which is kept at a constant value by the current limiter 123. The output voltage $V_{OUT}$, 404 has already risen after a few milliseconds to the target value of approximately 3.1 V. By means of the load a I2 at 500 µA, however, the output voltage $V_{OUT}$, 404 is always smaller than 3.1 V.

After 1.7 seconds, the energy storage apparatus 126, C1 is charged. This means that after 1.7 seconds, the energy storage apparatus 126 is usable and therefore the switch S1 switches. The switching of the switch S1 is simulated by the switching of the voltage source 205, V3. This switching of the switch S1 takes place after 1.7 seconds. By means of the switching of the switch S1, the voltage $V_{OUT}$, 404 is buffered by C1, 126. From the time point at which the switch S1 has switched, the current sink 104, I1 can load the output voltage $V_{OUT}$ with current spikes of, for example, 15 mA, as shown by the graph line 406. $V_{OUT}$ is shown in FIG. 4 as the graph line 404. The switching-on of the consumer with the large current requirement is shown in FIG. 4 by the rectangular and abruptly changing shape of the curve 406 which is switched on at approximately 1.75 s and switched off again after 1 ms. The voltage $V_{OUT}$, 404 falls only briefly during the rectangular impulse of the current loading I1 to approximately 2.95 V. This behaviour is covered in more detail in FIG. 5. Provided all the parts or components connected to the busbars 127, 128 tolerate such a collapse to approximately 2.95 V, they can be operated essentially without impairment by means of the connecting circuit. The information as to whether the respective components can operate with this voltage is noted in the respective data sheets. The current curve 405, $-I_{R5}$ which represents the variation of the current through the input resistor 113c, R5 shows that this current $-I_{R5}$ does not exceed a maximum value of 1.28 mA.

Despite the large current load through the consumer 104 at up to 15 mA, the voltage supply 200 or voltage source 200 is not loaded with a larger current than approximately 1.28 mA although internal currents of 15.5 mA flow in the electronics connected, in particular in the consumer 104.

Figure 5:
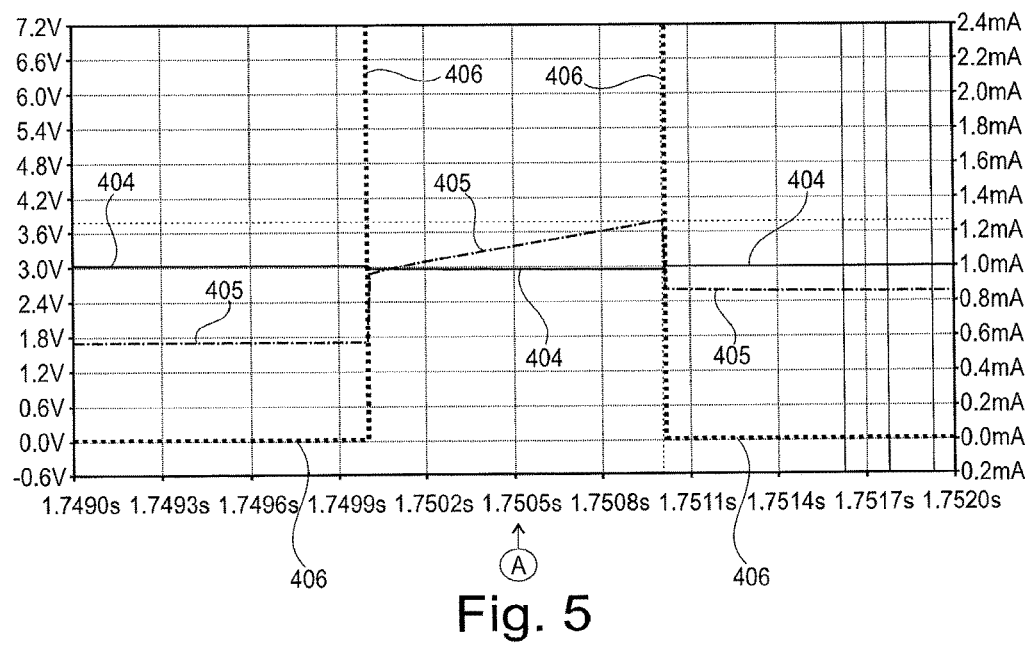
FIG. 5 shows a portion of the graphical representation of FIG. 4 during the switching in of a consumer with a large current requirement in accordance with an exemplary embodiment of the present invention.

FIG. 5 shows a portion of the graph of FIG. 4 in a region from 1.7490 to 1.7520 seconds. This portion shows the current and/or voltage pattern of the variables observed during the high current loading. The relevant portion is identified by the designation A in both FIGS. 4 and 5.

In the simulation, it is apparent that the connecting device 102 is suitable for carrying out a current limitation in order to optimise the starting behaviour of intrinsically safely supplied electronic assemblies.

Figure 6:
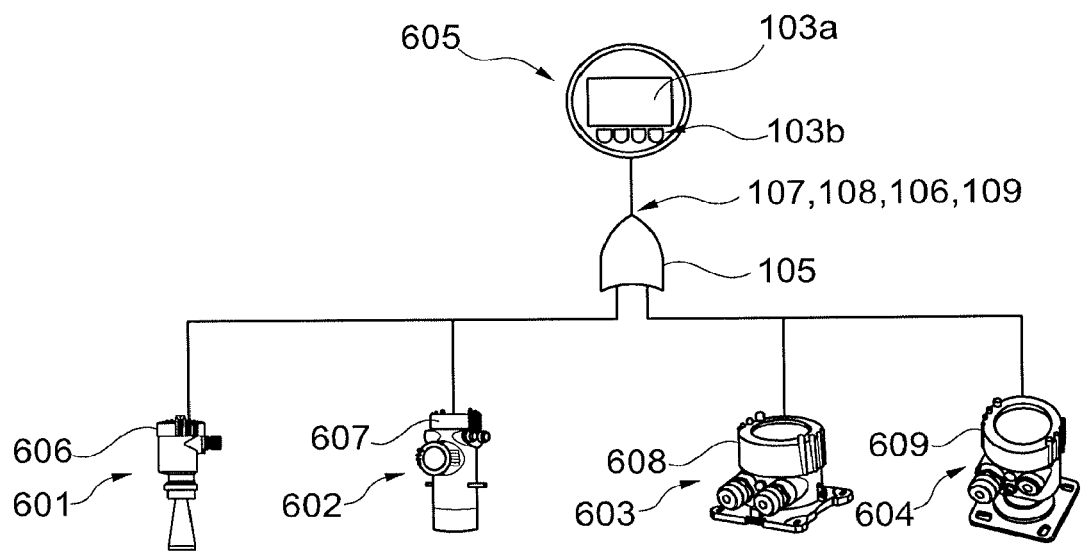
FIG. 6 shows the connection of a display apparatus and an input apparatus to a multiplicity of field devices in accordance with an exemplary embodiment of the present invention.

FIG. 6 shows the connection of a display apparatus 103a and an input apparatus 103b at a multiplicity of field devices 601, 602, 603, 604. The display apparatus 103a and the input apparatus 103b which is configured as a keypad 103b are grouped together in a round operating element 605, which can be accommodated in each case in one of the field devices 601, 602, 603, 604 in a cover 606, 607, 608, 609. The connection to the field device takes place via a contact surface 105 which is symbolically represented as an OR gate in FIG. 6 in order to symbolise the interchangeability of the operating element for the multiplicity of field devices 601, 602, 603, 604. The representation as an OR gate is intended to signify that the module 605 can be exchanged and that both data lines 107, 108 and also supply lines 106, 109 can extend over the contact surface 105. These lines are brought together in a bus. Via this bus, data can be sent to 103a and also the state of 103b can be notified to 601, 602, 603, 604. In this case, analogue signals, digital signals, switching signals and/or data can be exchanged. The operation of the operating apparatus 605 takes place on site, since only visual information is made available and/or tactile input signals can be input via the keypad 103b.

Figure 7:
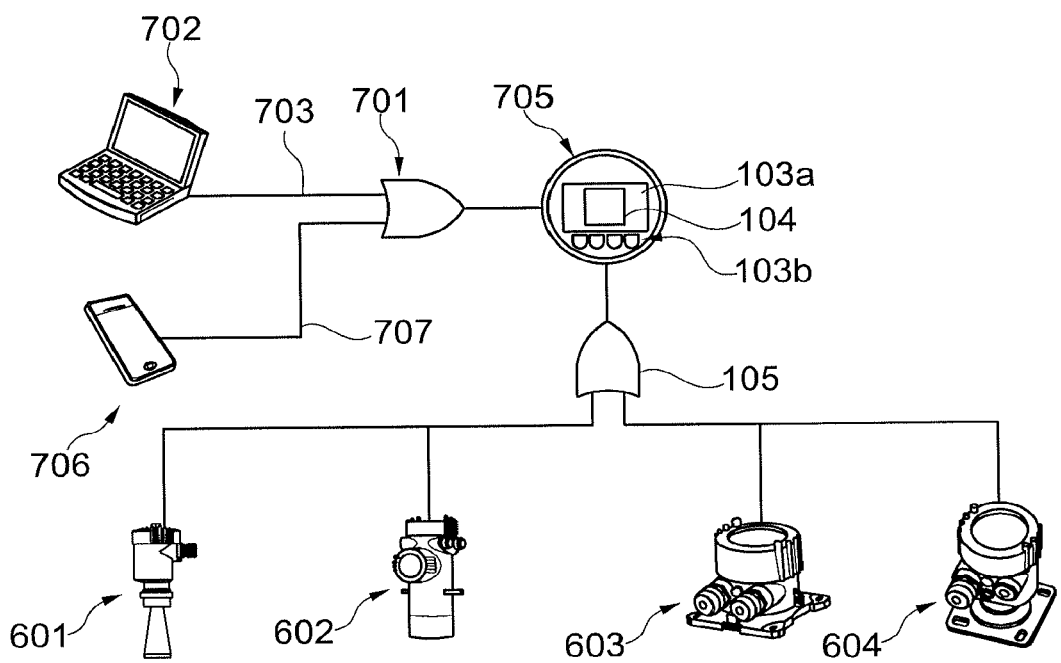
FIG. 7 shows the connection of a display apparatus and an input apparatus to a multiplicity of field devices having a radio module in accordance with an exemplary embodiment of the present invention.

FIG. 7 shows an input apparatus 705 which, in addition to the display apparatus 103a and the input apparatus 103b, also makes a radio connection 701 available by means of a radio apparatus 104. By means of the radio connection 701, for example a Bluetooth connection, a laptop computer 702 which is also equipped with a radio module can exchange data wirelessly in the form of analogue signals or digital signals via the connection 703. Tactile and visual signals, i.e. electromechanical input, can be exchanged directly on site at the operating element 705. The tactile input and visual signals are passed on via corresponding bus lines and/or the contact surface 105 to the respective field devices 601, 602, 603, 604. A mobile input apparatus, for example a smartphone 706 with a suitable application, can also make contact wirelessly with the input apparatus 705 via a radio connection 707 and exchange data. Thus, with a suitably equipped module 705, a further operating mode can be provided, for example via Bluetooth. Apart from the on-site operation directly on the operating element 705, for example via the display apparatus 103a, 103b, information can also be exchanged by remote stations 702, 706 with the operating apparatus 705 or with the field devices 601, 602, 603 or 604.

Figure 8:
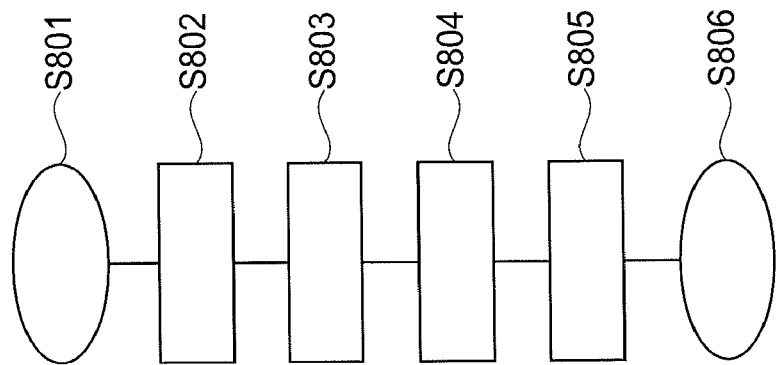
FIG. 8 is a flow diagram for a method for connecting an output connection to an input connection in accordance with an exemplary embodiment of the present invention.

FIG. 8 is a flow diagram for a method for connecting an output connection to an input connection in accordance with an exemplary embodiment of the present invention. The method begins with a start state S801. For example, following connection of a current supply, in step S802 controlled charging of an energy storage apparatus takes place via a charging apparatus, the input connection being connected via the charging apparatus to the energy storage apparatus.

In step S803, there follows a recognition of a presettable charge state of the energy storage apparatus and if the presettable charge state has been reached, in step S804, the energy storage apparatus is connected to the input connection.

In step S805, the connecting of the input connection to the output connection takes place during and/or following the connecting of the energy storage apparatus to the input connection.

The method ends in step S806.

In addition, it is pointed out that the terms "comprising" and "having" do not exclude any other elements or steps, and "a/an" or "one" does not exclude a plurality. It is also pointed out that features or steps which have been described with reference to one of the above embodiments can also be used in combination with other features or steps of other embodiments described above. Reference signs in the claims should not be construed as limiting the scope of the claims.

The invention claimed is:

1. A connecting device, comprising:
a control apparatus;
an energy storage apparatus;
an input connection; and
an output connection;
wherein the input connection is, via a first path, connected to the control apparatus, such that the control apparatus can be supplied with energy from the input connection, and is, via a second path, connected, by means of a charging apparatus, to the energy storage apparatus, wherein the charging apparatus is configured for controlled charging of the energy storage apparatus,
a first switch, arranged between the input connection and the energy storage apparatus;
a second switch arranged between the input connection and the output connection;
wherein the control apparatus is configured to close the first switch, after reaching a preset charge state of the energy storage apparatus, to connect the energy storage apparatus to the input connection, and
wherein the control apparatus is further configured to close the second switch, during and/or following connection of the energy storage apparatus to the input connection, to connect the input connection to the output connection, such that an apparatus connected to the output connection can be supplied with energy from both the input connection and the energy storage apparatus.

2. The connecting device according to claim 1, wherein the charging apparatus comprises a current limiting apparatus.

3. The connecting device according to claim 1, wherein the control apparatus comprises a timer and/or a voltage meter configured to determine a charge state of the energy storage apparatus.

4. The connecting device according to claim 1, wherein the energy storage apparatus is a capacitor.

5. The connecting device according to claim 1, wherein the input connection includes a resistor.

6. The connecting device according to claim 1, wherein the input connection is configured as a busbar in order to connect an apparatus having a small current requirement, and/or the output connection is configured as a busbar in order to connect an apparatus having a large current consumption.

7. The connecting device according to claim 1, wherein the energy storage apparatus is configured to provide a preset current for a preset time.

8. A field device, comprising:
a connecting device, comprising a control apparatus, an energy storage apparatus, an input connection, an output connection, wherein the input connection is, via a first path, connected to the control apparatus, such that the control apparatus can be supplied with energy from the input connection, and is, via a second path, connected to the energy storage apparatus by means of a charging apparatus, a first switch, arranged between the input connection and the energy storage apparatus, and a second switch, arranged between the input connection and the output connection:
- wherein the charging apparatus is configured for controlled charging of the energy storage apparatus,
- wherein the control apparatus is configured to close the first switch, after reaching a preset charge state of the energy storage apparatus, to connect the energy storage apparatus to the input connection,
- wherein the control apparatus is further configured to close the second switch, during and/or following connection of the energy storage apparatus to the input connection, to connect the input connection to the output connection, such that an apparatus connected to the output connection can be supplied with energy from both the input connection and the energy storage apparatus;

a current supply, which is connected to the input connection; and
a radio apparatus, which is connected to the output connection.

9. A method for connecting an output connection to an input connection, comprising:
controlled charging of an energy storage apparatus by means of a charging apparatus, wherein an input connection is, via a first path, connected to a control apparatus, such that the control apparatus can be supplied with energy from the input connection, and the input connection is, via a second path, connected via the charging apparatus to the energy storage apparatus;
identifying a preset charge state of the energy storage apparatus;
connecting the energy storage apparatus to the input connection after the identified preset charge state has been reached, by closing a first switch arranged between the input connection and the energy storage apparatus; and
connecting the input connection to the output connection during and/or following the connection of the energy storage apparatus to the input connection, by closing a second switch arranged between the input connection and the output connection, such that an apparatus connected to the output connection can be supplied with energy from both the input connection and the energy storage apparatus.

10. A nontransitory computer-readable storage medium having a program stored therein, which when executed by a processor, performs a method, comprising:
controlled charging of an energy storage apparatus by means of a charging apparatus, wherein an input connection is, via a first path, connected to a control apparatus, such that the control apparatus can be supplied with energy from the input connection, and the input connection is, via a second path, connected via the charging apparatus to the energy storage apparatus;
identifying a preset charge state of the energy storage apparatus;
connecting the energy storage apparatus to the input connection after the identified preset charge state has been reached, by closing a first switch arranged between the input connection and the energy storage apparatus; and
connecting the input connection to an output connection during and/or following the connection of the energy storage apparatus to the input connection, by closing a second switch arranged between the input connection and the output connection, such that an apparatus connected to the output connection can be supplied with energy from both the input connection and the energy storage apparatus.

* * * * *